United States Patent [19]

Kitamura et al.

[11] 4,352,178

[45] Sep. 28, 1982

[54] CARTRIDGE EQUALIZER

[75] Inventors: Masaki Kitamura, No. 9-22, 1-chome, Higashi, Okegawashi, Saitama, Japan; Naoki Saisu, Kitamotoshi; Shigeo Koide, Higashimurayamashi, both of Japan

[73] Assignee: Masaki Kitamura, Saitama, Japan

[21] Appl. No.: 149,831

[22] Filed: May 14, 1980

[30] Foreign Application Priority Data

May 17, 1979 [JP] Japan .......................... 54-66036[U]

[51] Int. Cl.³ .............................................. G11B 3/16
[52] U.S. Cl. ................................... 369/252; 369/254
[58] Field of Search ................... 369/249–254

[56] References Cited

U.S. PATENT DOCUMENTS 4,113,265 9/1978 Iyeta .................. 369/254 X

FOREIGN PATENT DOCUMENTS 2303337 11/1976 France ............................ 369/252

*Primary Examiner*—Harry N. Haroian
*Attorney, Agent, or Firm*—Browdy & Neimark

[57] ABSTRACT

A cartridge equalizer for obtaining excellent sound quality following the original sound with high fidelity by minimizing the positional shift of the cantilever fulcrum of a cartridge by mounting the cartridge equalizer to a portion near the cartridge of the tone arm of a record player and providing a well-balanced, suitable amount of weight. The cartridge equalizer includes a ring-shaped crossing rod made of a light alloy or the like having respective counterweights mounted at each end of the crossing rod, and a ring-shaped fitting positioned at the central portion of the crossing rod for fastening the cartridge equalizer to the tone arm.

3 Claims, 3 Drawing Figures

FIG_1
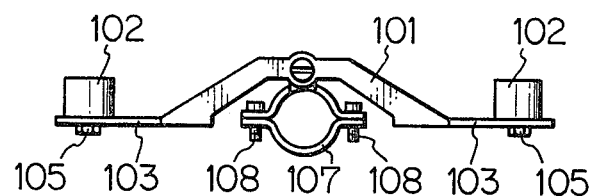
FIG_2
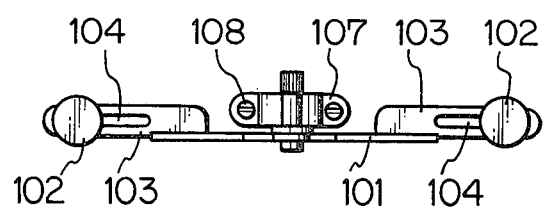
FIG_3
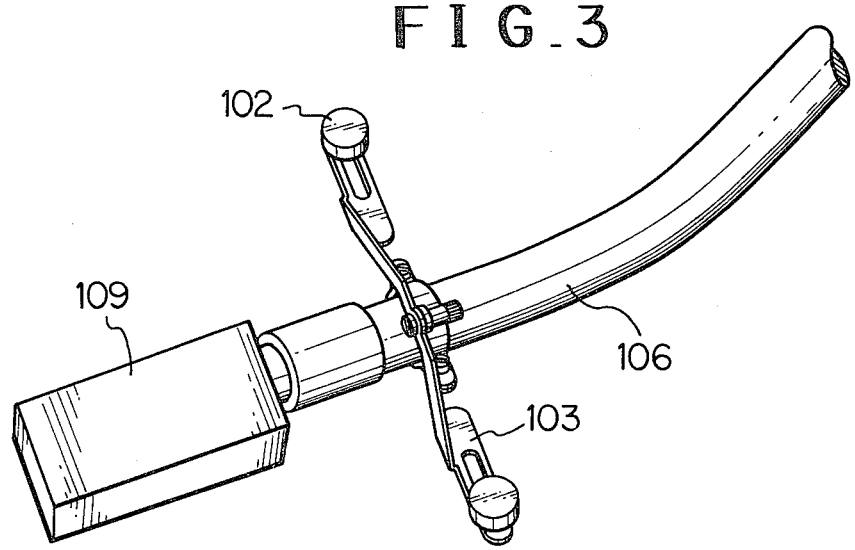

CARTRIDGE EQUALIZER

BACKGROUND OF THE INVENTION

The present invention relates to a cartridge equalizer, and, more particularly to a cartridge equalizer fastened to a portion of the tone arm of a record player close to the cartridge and stabilized by providing a well-balanced, suitable amount of weight on the tone arm.

It can be said that the total performance of a cartridge for obtaining audio signals by means of the vibration of the stylus thereof is determined by the suitability of the movement of the stylus, which movement is greatly affected by the performance of the arm. Although the cartridge and the tone arm are intimately associated with each other, as mentioned hereinabove, studies have been concentrated only on the improvement of the individual performance of the cartridge or the tone arm, but any developments, wherein the cartridge and the tone arm are considered as a unitary device, have not been conducted. The present invention has been devised after numerous studies by carefully taking the above-mentioned points into consideration.

Ideally, unnecessary vibrations except for the vibration of the stylus must be minimized in the action of the cartridge in order to obtain accurate audio signals. For the purpose of doing this, there is a method wherein the rigidity of the head shell or the tone arm is increased or the play of the bearing is eliminated. However, it must be noted that there appears the instability in the operation of the vibration system of the cartridge when the change in frequency occurs, that is, an exceedingly long swing appears in the lateral movement of the cantilever. This results in shifting the position of the vibration fulcrum to produce a poor tracking capability. Conventionally, as a countermeasure for avoiding such problem, the structure of a damper and a cantilever have been improved. However, any countermeasures improving the tone arm parts have not been proposed.

SUMMARY OF THE INVENTION

An object of the present invention is to provide a cartridge equalizer, as a countermeasure to improving the tone arm parts, wherein a stable weight is applied at the position adjacent to the cartridge to minimize the positional shift of the cantilever fulcrum and to improve the stability of the tone arm, to thereby enable maximum utilization of the performance of the cartridge possible and provide excellent resolution for delicate audio signals and produce suitable sound position.

According to the present invention, counterweights are mounted on both ends of a wing section-shaped crossing rod of a light alloy or the like, and a ring-shaped fitting for fastening the crossing rod to the tone arm is mounted at the central portion of the crossing rod. In order to be fastened to the tone arm, the fitting is divided into two pieces which are positioned around the tone arm and then fastened by screws to each other.

BRIEF DESCRIPTION OF THE DRAWINGS

FIG. 1 is a front view of a cartridge equalizer of a preferred embodiment according to the present invention;

FIG. 2 is a plan view of the cartridge; and

FIG. 3 is a perspective view explaining the state wherein the cartridge is utilized.

DETAILED DESCRIPTION OF A PREFERRED EMBODIMENT

A preferred embodiment according to the present invention is illustrated in the drawings, wherein reference numeral 101 designates a crossing rod shaped into a wing section and made of a thin plate of a light alloy, extending in the diagonally downward direction at the intermediate portions thereof and then turned 90° toward the horizontal direction so that end portions 103 extend in a plane which makes a 90° angle with respect to the vertical. The entire width of the crossing rod varies from six to nine centimeters. Such configuration of the crossing rod 101 is considered as being the best from the viewpoint of strength thereof. Reference numeral 102 designates two counterweights of two to three grams each in weight mounted on the respective horizontal end portions 103 of the crossing rod 101. Each counterweight 102 may be respectively, permanently fixed to the corresponding horizontal portion 103, and may also be fixed by inserting a screw projecting from the bottom of a respective counterweight 102 into the elongated aperture 104 formed at each nut horizontal portion 103 and then fastening same with a respective 105. In such a case, the position of the counterweights 102 can be adjusted after loosening the associated nut 105. This feature results in the advantage of enabling the balance adjustment of the tone arm 106 by adjusting the position of the left and right counterweights 102 when the tone arm 106 is not otherwise well-balanced. Reference numeral 107 indicates a ring-shaped fitting capable of being divided into two pieces after screws 108 are loosened to permit the separation of the pieces from one another. The fitting 107 is attached around the portion near the cartridge 109 and then fixed to the tone arm 106 by fastening the screws 108.

The present invention constructed as shown in the accompanying drawing figures and described above provides the well-balanced, suitable amount of weight which slightly moves in the horizontal direction to stabilize the tone arm and to provide the inertia in the movement of the cantilever. As a result, only the stylus can vibrate to reproduce original sounds with high fidelity and to provide superior trackability. At the same time, local vibration is reduced, thereby reducing local resonant vibration and preventing the play at the bearing of the tone arm. Therefore, the advantage of producing a high level of sound quality can be achieved.

What is claimed is:

1. A cartridge equalizer adapted to be added onto a tone arm comprising:

a crossing rod having a wing section-shape including a central portion, two intermediate portions extending diagonally downward from said central portion and two end portions which extend respectively from the downwardmost portions of said intermediate portions;

respective counterweights mounted on respective ones of said end portions of said crossing rod;

means to adjust the position of each of said counterweights on its respective end portion of said crossing rod;

a ring-shaped fitting at said central portion of said crossing rod for fastening the equalizer to a tone arm;

and said ring-shaped fitting comprising means to permit it to be removably fastened to a tone arm at any selected location on said tone arm including positions close to a cartridge mounted on the end of an associated tone arm, said ring-shaped fitting defining a plane substantially perpendicular to the axis of said tone arm;

said ring-shaped fitting removable fastening means comprising a pair of half fittings one of which is secured to said crossing rod central portion and the other of which is a mating separate piece, said fitting halves defining a shape snuggly mating to the cross-sectional shape of a tone arm on which the equalizer is to be fastened, securing means for fastening said separate piece half fitting to the mating half fitting on said central portion with the tone arm sandwiched therebetween;

said crossing rod being formed of thin plate material consisting of a light weight alloy;

the planes of said diagonally extending portions of said crossing rod being substantially parallel to said ring-shaped fitting plane and the planes of said end portions of said crossing rod being substantially at right angles to said ring-shaped fitting plane;

whereby said counterweights can be adjusted towards and away from said tone arm axis individually, and whereby the entire cartridge equalizer can be adjusted on said tone arm with respect to said cartridge with the use of said ring-shaped fitting with no modification whatsoever to said tone arm.

2. A cartridge equalizer as set forth in claim 1, and means to adjust the position of said wing section-shaped crossing rod with respect to said ring-shaped fitting about an axis parallel to the axes of said ring-shaped fitting and of said tone arm whereby said counterweights together with said crossing rod can be rotated about said axis parallel to said tone arm axis.

3. A cartridge equalizer as set forth in claim 1, wherein said ring-shaped fitting is formed on the same light weight alloy thin plate material as said crossing rod.

* * * * *

UNITED STATES PATENT AND TRADEMARK OFFICE
CERTIFICATE OF CORRECTION

PATENT NO. : 4,352,178

DATED : September 28, 1982

INVENTOR(S) : KITAMURA et al

It is certified that error appears in the above-identified patent and that said Letters Patent is hereby corrected as shown below:

Column 2, line 23, delete "nut";
line 25, after "respective" insert -- nut --.

Signed and Sealed this

Nineteenth Day of July 1983

[SEAL]

Attest:

GERALD J. MOSSINGHOFF

Attesting Officer    Commissioner of Patents and Trademarks